(12) United States Patent
Tenghamn et al.

(10) Patent No.: US 11,852,770 B2
(45) Date of Patent: Dec. 26, 2023

(54) TARGETED ACTIVATION PARAMETERS FOR MARINE SEISMIC SOURCES

(71) Applicant: PGS Geophysical AS, Oslo (NO)

(72) Inventors: Stig Rune Lennart Tenghamn, Hollywood, FL (US); Manuel Beitz, Oslo (NO); Christian Strand, London (GB)

(73) Assignee: PGS Geophysical AS, Oslo (NO)

( * ) Notice: Subject to any disclaimer, the term of this patent is extended or adjusted under 35 U.S.C. 154(b) by 993 days.

(21) Appl. No.: 16/656,288

(22) Filed: Oct. 17, 2019

(65) Prior Publication Data

US 2020/0408945 A1 Dec. 31, 2020

Related U.S. Application Data

(60) Provisional application No. 62/867,825, filed on Jun. 27, 2019.

(51) Int. Cl.
*G01V 1/38* (2006.01)
*B63B 35/68* (2006.01)

(52) U.S. Cl.
CPC ............ *G01V 1/3808* (2013.01); *B63B 35/68* (2013.01)

(58) Field of Classification Search
CPC .............................. G01V 1/3808; B63B 35/68
See application file for complete search history.

(56) References Cited

U.S. PATENT DOCUMENTS

| | | | |
|---|---|---|---|
| 9,529,106 B2 | 12/2016 | Mandroux et al. | |
| 2017/0176619 A1* | 6/2017 | Abma | G01V 1/005 |
| 2019/0187315 A1* | 6/2019 | Orji | G01V 1/282 |
| 2020/0049842 A1* | 2/2020 | Alshuhail | G01V 1/325 |

FOREIGN PATENT DOCUMENTS

| | | | | |
|---|---|---|---|---|
| EP | 2184619 A2 | 5/2010 | | |
| EP | 2184619 A3 | 8/2011 | | |
| WO | WO-2007130551 A2 * | 11/2007 | | G01V 1/003 |
| WO | 2018/229260 A1 | 12/2018 | | |
| WO | 2019/034731 A1 | 2/2019 | | |
| WO | WO-2019034731 A1 * | 2/2019 | | G01V 1/005 |

OTHER PUBLICATIONS

GB Search Report in Application No. GB2016261.6 dated Apr. 29, 2022, 2 pages.
GB2016261.6 Search Report, 4 pages (dated Feb. 26, 2021).

* cited by examiner

*Primary Examiner* — Krystine E Breier

(57) ABSTRACT

Techniques are disclosed relating to marine geophysical surveys. Various output characteristics of a vibratory source may be modified based on whether a source is targeting an identified portion of a survey area. The portion of the survey area may be detected during the survey or may be pre-identified. In some embodiments, a survey system drives a vibratory source using digital codes having different lengths based on whether the source is targeting an identified portion of a survey area. The disclosed techniques may improve imaging of geology under certain types of formations or may reduce environmental impact, in various embodiments.

13 Claims, 7 Drawing Sheets

Digital code 610

Digital code 620

| Digital code 610 | Digital code 610 |

| Digital code 610 | Digital code 630 |

FIG. 6

TARGETED ACTIVATION PARAMETERS FOR MARINE SEISMIC SOURCES

This application claims the benefit of U.S. Provisional Application No. 62/867,825, filed on Jun. 27, 2019, which is incorporated by reference herein in its entirety.

BACKGROUND

Geophysical surveys are often used for oil and gas exploration in geological formations, which may be located below marine environments. Seismic surveys, for example, are based on the use of acoustic waves. In seismic surveys, a survey vessel may tow one or more signal sources (e.g., air guns) and a plurality of streamers along which a number of acoustic sensors (e.g., hydrophones and/or geophones) are located. Alternatively or additionally, acoustic sensors may be located on the sea floor, such as in nodes or cables. Acoustic waves generated by the source(s) may be transmitted to the earth's crust and then reflected back and captured at the sensors. Data collected during a marine geophysical survey may be analyzed to locate hydrocarbon-bearing geological formations, and thus determine where deposits of oil and natural gas may be located.

Marine surveys are conducted in many different marine environments, each of which may present different challenges to seismic acquisition. For example, a marine environment may include geological structures (e.g., shallow gas pockets, carbonate plateaus, volcanic intrusions, etc.) disposed beneath the water bottom that may cause attenuation of the seismic signals generated by the signal sources. The attenuating effect of such geological structures may have a detrimental effect on seismic data acquisition operations.

BRIEF DESCRIPTION OF THE DRAWINGS

FIG. 6 is a diagram illustrating digital codes of different lengths, according to some embodiments.

Figure 1:
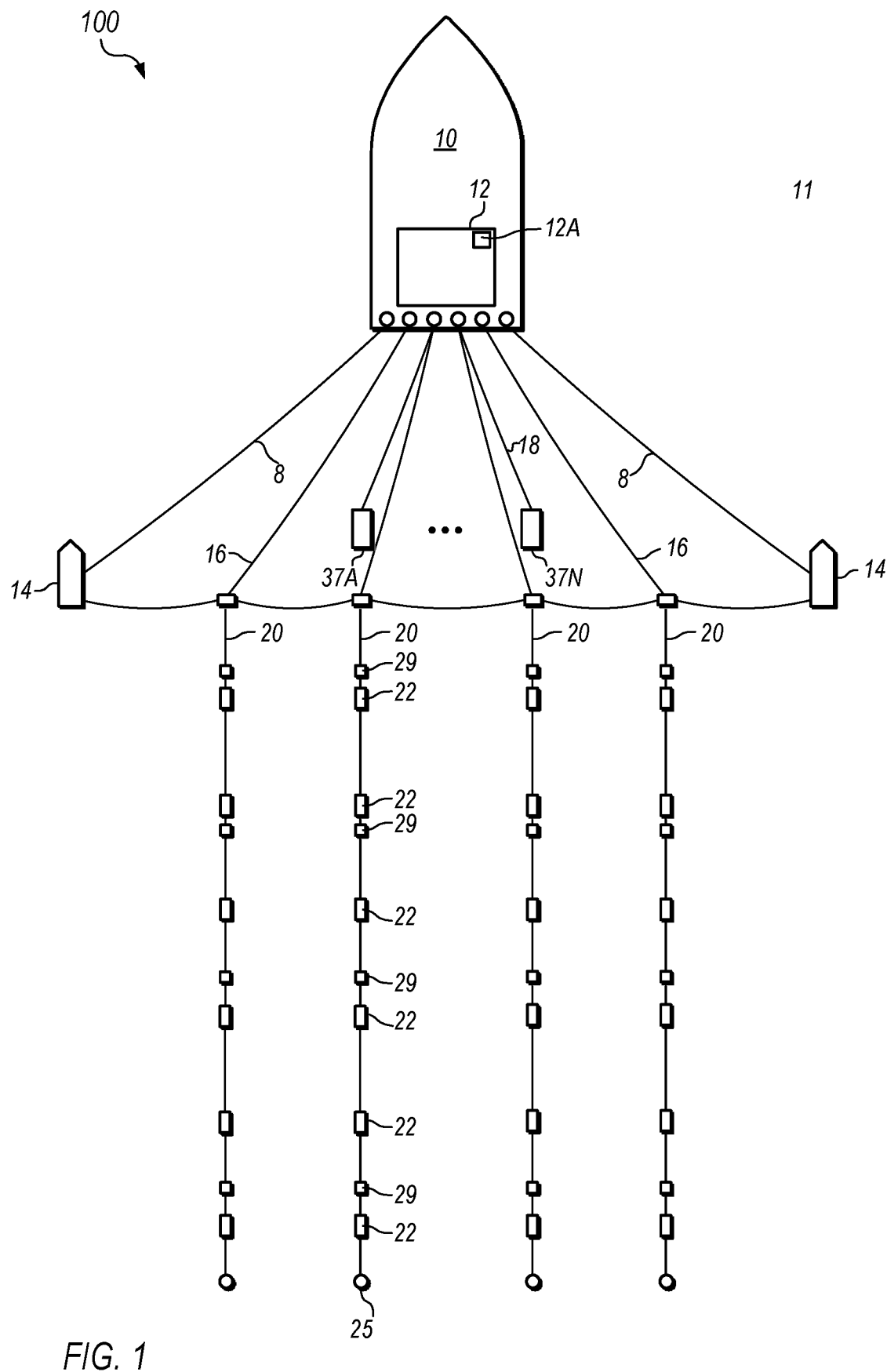
FIG. 1 is a block diagram illustrating an example geophysical survey system, according to some embodiments.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "Control equipment configured to activate a signal source" is intended to cover, for example, equipment that has circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

DETAILED DESCRIPTION

Example Survey System

FIG. 1 is a block diagram illustrating a geophysical survey system 100, according to some embodiments. In various embodiments, survey system 100 is configured to acquire geophysical data corresponding to geological structures disposed below body of water 11. In the illustrated embodiment, system 100 includes survey vessel 10, which tows signal sources 37, streamers 20, and paravanes 14. In other embodiments, at least a portion of streamers 20 may be towed by a second survey vessel (not shown), in place of or in addition to survey vessel 10. Similarly, in some embodiments, at least a portion of signal sources 37 may be towed by one or more additional survey vessels (not shown), in place of or in addition to survey vessel 10. Further, ocean bottom nodes (OBN) or cables may include sensors in addition to or in place of streamer-implemented sensors and may be placed at fixed locations on the sea floor.

In survey system 100, survey vessel 10 is shown towing multiple signal sources 37A-37N (referred to collectively as "sources 37" or "signal sources 37") using source cables 18. In various embodiments, however, survey vessel 10 may tow any appropriate number of signal sources, including as few as none (e.g., when sources are towed by another vessel). In some embodiments, the disclosed techniques are used with a single source 37. One or more of signal sources 37 may be vibratory signal sources that may be configured to be driven according to a given function by control equipment 12. For example, one or more of signal sources 37 may be vibratory signal sources configured to be driven according to a given function or digital code such as a gold code.

In FIG. 1, signal sources 37 are laterally spaced, relative to a centerline of survey vessel 10, to form an array of signal sources 37. In various embodiments, sources 37 may be towed at various widths including wide tow (e.g., with sources at a greater lateral distance than the outermost streamer cables) or narrower towing techniques, as shown in FIG. 1. Further, different sources may be spaced apart in the in-line direction or at different depths. The source(s) discussed herein may be towed by the same vessel as the survey sensors (e.g., the streams) or by a different vessel.

Survey vessel 10 includes equipment, shown generally at 12 and, for convenience, collectively referred to as "control equipment." Control equipment 12 may include devices such as a data recording unit (not shown separately) for making a record of signals generated by various geophysical sensors 22 in the system 100. Control equipment 12 may also include navigation equipment (not shown separately), which may be configured to control, determine, and record the geodetic positions of: survey vessel 10, each of a plurality of geophysical sensors 22 disposed at locations on streamers 20, if present, and signal sources 37. Geodetic position may be determined using various devices, including global navigation satellite systems such as the global positioning system (GPS), for example. In the illustrated embodiment, survey vessel 10 includes geodetic positioning device 12A. Additional positioning devices may be placed at various locations on streamers 20. In some embodiments, control equipment 12 is configured to control sources 37, e.g., to control when the sources 37 activate, where the sources 37 are positioned, the manner in which the sources 37 are activated, etc. Note that, although control equipment 12 is shown on survey vessel 10, this embodiment is provided merely as an example and is not intended to limit the scope of the present disclosure. In various embodiments, components of control equipment 12, or the entirety of control equipment 12, may alternatively be located on a separate vessel (not shown) or at a remote location as desired.

Control equipment 12 may include a computing system (an example embodiment of which is discussed below with reference to FIG. 8) configured to, inter alia, process sensor outputs from geophysical sensors 22. In other embodiments, a computing system at another location may process geophysical data gathered by geophysical survey system 100 (e.g., on land after a survey has been conducted). A computing system may include or be configured to access a non-transitory, computer-readable storage medium having instructions stored thereon that are executable to perform operations described herein in order to conduct a survey or process sensor outputs generated during a survey. A computing system may include one or more processors configured to execute the program instructions to cause a system to perform various functionality described herein.

In FIG. 1, survey vessel 10 tows four streamers 20 using lead-in cables 16. In various embodiments, however, survey vessel 10 may tow any appropriate number of streamers, including as few as none (e.g., when streamers are towed by another vessel or when ocean bottom nodes or cables are in use) or as many as 26 or more. Streamers 20 of FIG. 1 include geophysical sensors 22. Geophysical sensors 22 on streamers 20 or in ocean bottom nodes or cables may be any of various types of geophysical sensor. Examples include hydrophones and/or geophones in some embodiments. Non-limiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors, or any suitable combination of the foregoing. In various implementations of the disclosure, geophysical sensors 22 may measure, for example, seismic field energy indicative of the response of various structures in the Earth's subsurface formation below the bottom of body of water 11 to energy imparted into the subsurface formation by one or more of signal sources 37. Seismic energy, for example, may originate from signal sources 37 deployed in body of water 11 and towed by survey vessel 10.

In various embodiments, streamers 20 may include any of various appropriate modules in addition to geophysical sensors 22. In geophysical survey systems that include a plurality of laterally spaced-apart streamers, such as system 100, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation. In some embodiments, survey vessel 10 may be configured to tow different streamers 20 at different depths and/or different lateral displacements from a centerline of survey vessel 10. In FIG. 1, streamers 20 further include birds 29, which are steering devices configured to maintain streamers 20 in a desired position (e.g., at a specified depth and/or lateral displacement). Similarly, steering devices may be used to facilitate positioning of sources 37. In some embodiments, survey vessel 10 may be configured to tow streamers 20 using various geometries such as different feather angles, depth profiles etc. In some embodiments, streamers 20 may include multiple geodetic positioning devices (not shown). In some embodiments, streamers 20 include tail buoys 25.

In some embodiments, a geophysical data product may be manufactured according to techniques described in this disclosure. A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized and/or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured (or remanufactured) subsequent to survey completion, e.g., during the course of analysis of the survey.

Overview of Using Different Source Parameters when Targeting Certain Survey Areas A survey area may have various different formations, some of which may attenuate signaling from a seismic source and cause difficulty imaging underlying geology. For example, shallow gas pockets may reside in geology without a hard boundary, shallow carbonates may attenuate high frequencies and cause strong multiples due to proximity to the water bottom, or volcanic intrusions may appear between geological sequences and may attenuate certain frequencies. Techniques discussed in detail below may improve imaging of underlying geology, e.g., by tailoring seismic source parameters to the formations being targeted. As one example, a vibratory source may be driven using digital codes of different lengths during different portions of a survey pass, which may affect the frequency content of the source signal, with commensurately improved illumination of geologic formations in the subsurface.

Figure 2:
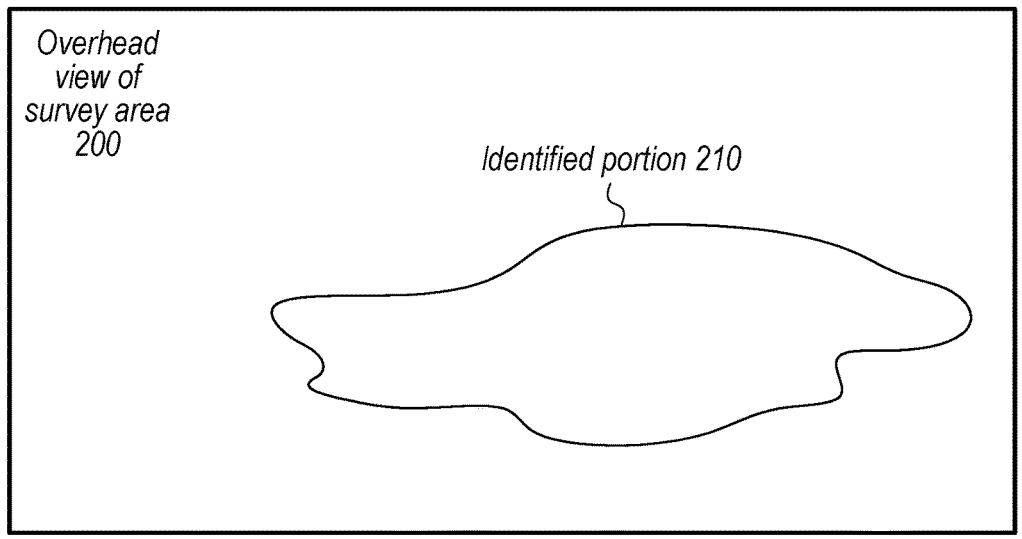
FIG. 2 is a diagram illustrating an example overhead view of a survey area that includes an identified portion, according to some embodiments.

FIG. 2 is an overhead view of a survey area 200. In the illustrated example, a portion of interest 210 of the survey area has been identified. The area 210 may be identified prior to a survey, e.g., based on a past survey, another survey using different equipment, etc. The area 210 may also be identified during a survey, e.g., using an on-line monitoring tool. In the latter embodiments, the area 210 may be identified during a pass and one or more vibratory sources tuned to target the area 210 during the pass or during a subsequent pass.

The identified portion 210 of the survey area may be delineated using various granularities, shapes, numbers of dimensions, types of coordinates, etc. For example, the area may be specified using latitude and longitude. As another example, the area may be specified as a three-dimensional space. In some embodiments, the area may be identified during a particular time interval, e.g., a time during which an area may be environmentally sensitive. Further, the area may be an estimate based on detected underlying geology but may or may not match the shape of the underlying geology.

Figure 3:
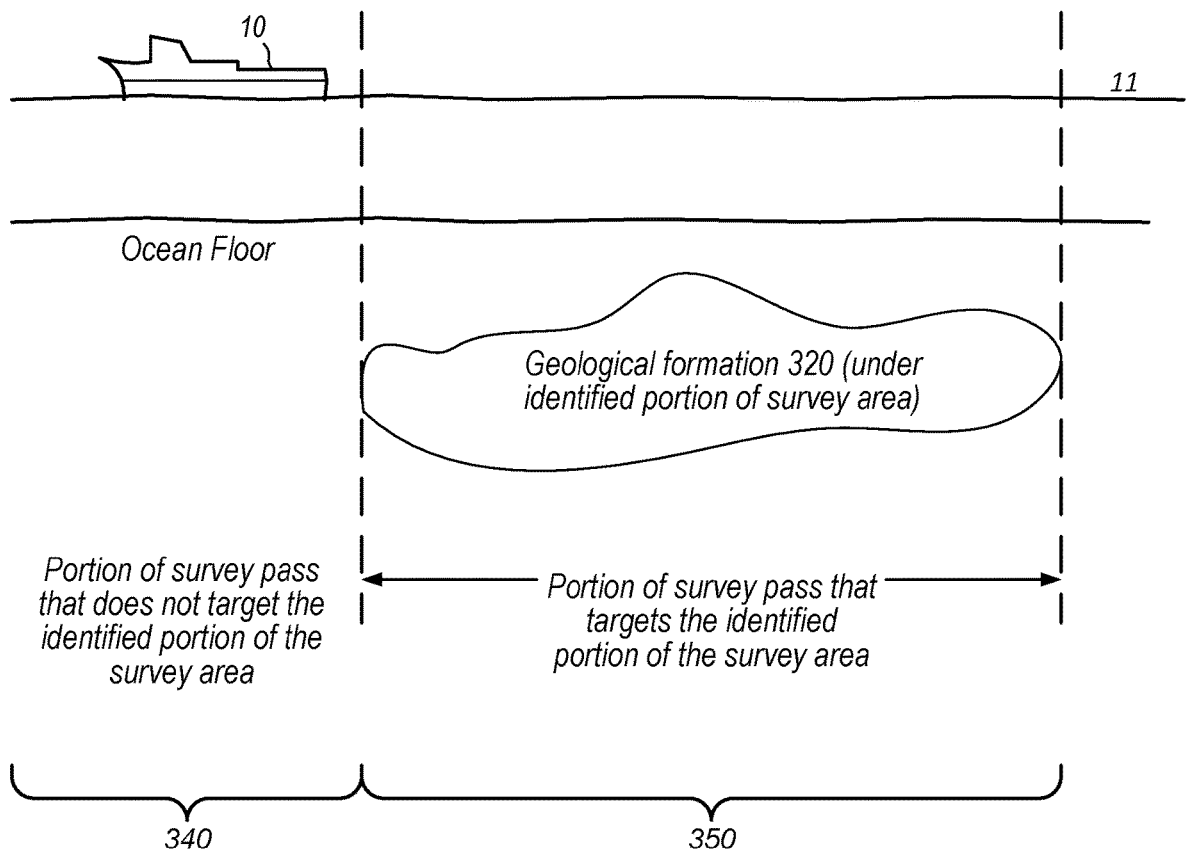
FIG. 3 is a diagram illustrating example portions of a survey pass, where different vibratory source activation parameters are used based on whether an identified portion of the survey area is targeted, according to some embodiments.

FIG. 3 is a side view of the survey area 200, including a geological formation 320 underlying the identified portion 210 of the survey area. Vessel 10 tows a survey array (not shown) during one or more passes over the geological formation 320. As shown, a portion 340 of a survey pass does not target the identified portion 210 of the survey area and another portion 350 of the survey pass targets the identified portion 210 of the survey area.

Digital codes with different lengths may be used to drive a vibratory source during different portions of the survey pass. For example, the system may drive the source using a gold code with 2000 bits when targeting the area 210 and a gold code with 1000 bits during other parts of the survey. Varying the length of the codes may affect the frequencies emitted, which may be useful, e.g., to boost frequencies that would be attenuated by an identified type of formation. Additional examples of gold codes with different lengths are discussed below with reference to FIG. 6. Gold codes (also referred to as gold sequences) have bounded, relatively-small cross-correlations within a set of codes, which may be useful when operating multiple sources simultaneously. Techniques for generating gold codes are well-understood by those skilled in the art, e.g., using linear feedback shift registers whose input bit is a linear function of its previous state (typically an exclusive-or function). In other embodiments, any of various functions or digital codes may be used to modulate acoustic sources, and these functions or codes may be pseudo-random and may meet some threshold for correlation among a set of codes.

Driving a vibratory source using a digital code may include modulating another signal, e.g., a carrier wave using the code. This modulation may have a spreading effect on the frequencies of the resulting output signal. The modulated signal may be used to drive one or more elements (e.g., drums) of the vibratory source to emit corresponding seismic signals. Thus, parameters for driving a vibratory source may be changed dynamically during a survey pass, e.g., by altering the digital code used for modulation.

As the term is used herein, a survey system "targets" an area when signals from at least one source are reflected from the area and received by a sensor of the system. The system may determine whether the source/sensor array is targeting the identified portion of the survey area based on the geodetic locations of the sources and sensors and an acquisition technique being used. For example, in some embodiments a source/sensor pair is considered to target the identified portion of the survey area 210 when the mid-point between the source and sensor falls within the area, and is considered not to target the identified portion of the survey area when the mid-point falls outside of the area. Thus, in some situations, part of the source array may target area 210 and part may not. In this scenario, different parts of the array may operate differently based on whether they target an identified portion of the survey area, e.g., the system may drive different sources, at the same time, using gold codes of different lengths. Alternatively, the entire source array may be operated using parameters for area 210 when at least a portion of the array targets area 210, for example.

Additional Example Source Parameters

In addition to the varying digital code lengths discussed above, one or more other parameters may be adjusted based on whether a source or set of sources is targeting a particular portion of a survey area. As discussed in further detail below, such parameters may include, without limitation: the number of sources activated, shot-point interval, or source amplitude.

Figure 4A:
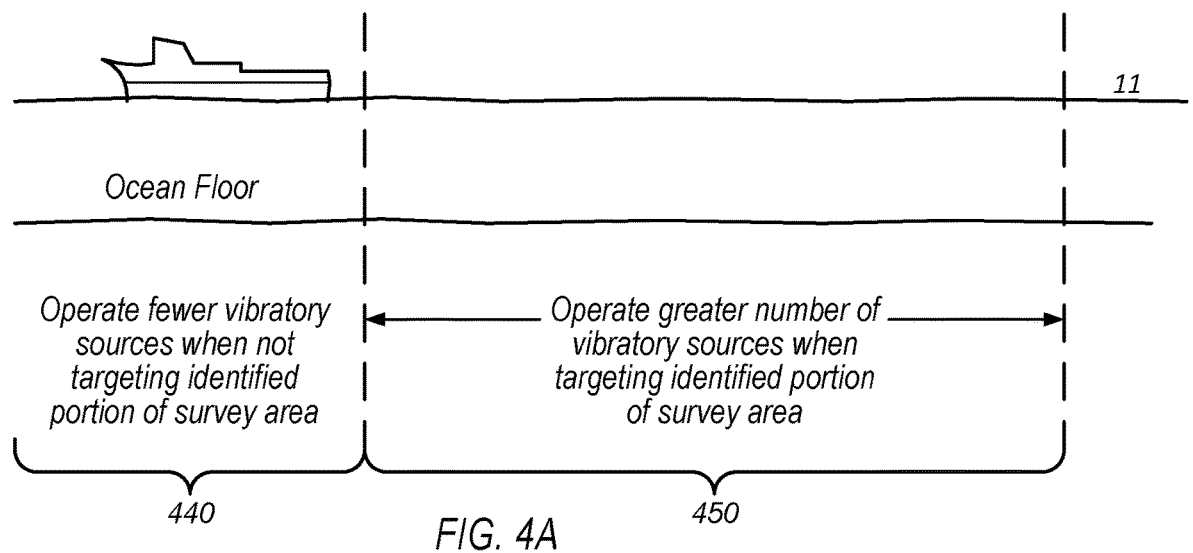
FIGS. 4A-4C are diagrams illustrating examples of source activation parameters that may be varied during a survey pass, according to some embodiments.
Figure 4B:
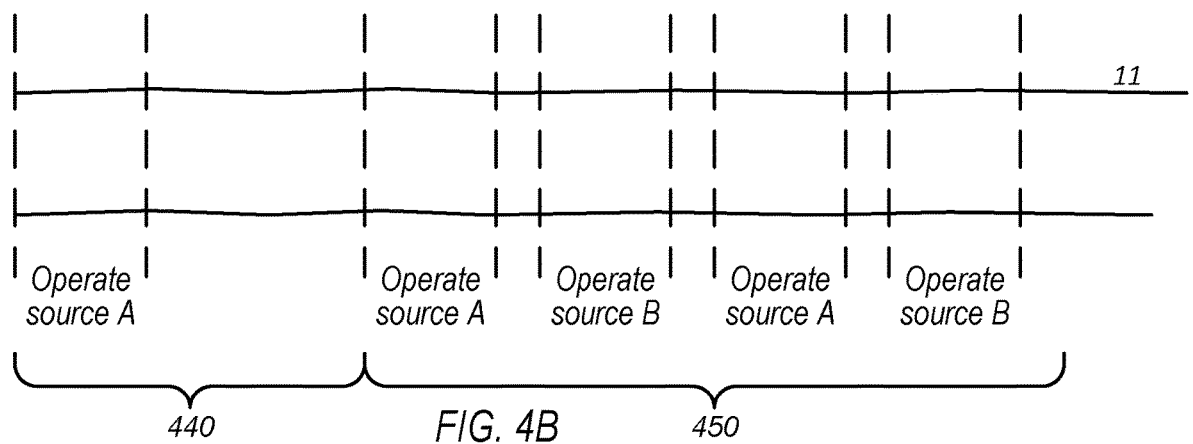
Figure 4C:
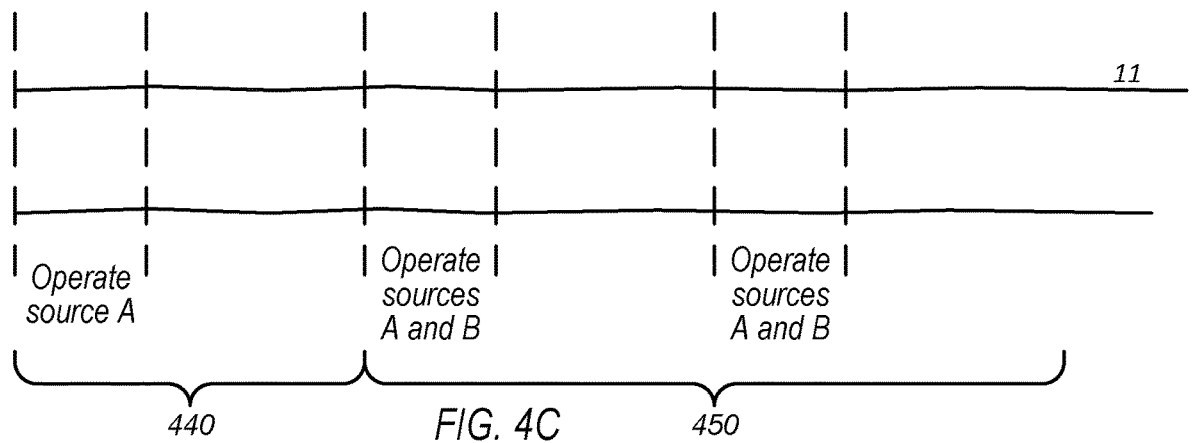

FIG. 4A-4C are side-view diagrams illustrating example techniques for operating a greater number of vibratory sources when targeting an identified portion of a survey area than when not, according to some embodiments. In these examples, a single vibratory source A is operated when not targeting the identified portion 210 (e.g., during portion 440 of the survey pass) and multiple vibratory sources A and B are operated when targeting the identified portion 210 (e.g., during portion 450 of the survey pass). In other embodiments, any of various numbers of sources may be operated in different targeting scenarios. Speaking generally, these examples may use spare sources that are not used for all parts of a survey but are driven when targeting certain portions of the survey area.

In the example of FIG. 4B, source A and source B are operated at different times while targeting the identified portion 210 during portion 440 of the survey pass, whereas only one source A is operated while not targeting the identified portion 210 during portion 450 of the survey pass. This may reduce the shot-point intervals between source sweeps, which may improve survey resolution for the identified portion 210 of the survey area. Speaking generally, in some embodiments the system uses different shot point intervals for a given source, or among sources in a set of sources, when targeting an identified portion 210 of a survey area than when targeting other portions. In the example of FIG. 4C, source A and source B are operated at the same time while targeting the identified portion 210, whereas only one source (source A) is operated while not targeting the identified portion 210. In embodiments where source A and source B are driven using the same function, this may increase the amplitude of source signals when targeting the identified portion 210 of the survey area. Note that, in some embodiments, source amplitude of a single source may be increased when targeting the identified portion 210 of the survey area, e.g., by adjusting amplification of input signals to the source.

Note that various techniques disclosed herein may be used with sources operated continuously, wherein the sources begin another sweep each time a previous sweep is finished (e.g., repeating a gold code or beginning another gold code each time a code is finished). In these embodiments, adding sources when targeting a portion 210 of the survey area may beneficially affect source signal amplitude at one or more frequencies over portion 210.

As used herein, the term "sweep" refers to the concept of driving a vibratory source to output acoustic signals during a time interval. For example, a linear sweep may begin at a low frequency bound and increase the output frequency to an upper frequency bound during the sweep (or vice versa). A random sweep may emit signals at random frequencies during the interval. In the context of digital codes, the system may drive the source using a digital code during the time interval. Between sweeps, the source may not emit acoustic signals (unless continuously sweeping). Various techniques discussed herein in the context of digital codes such as gold codes may be applied to other types of sweeps. For example, changing the duration of linear sweeps may affect their frequency content (e.g., if the rate of frequency change of a shorter sweep is the same as a longer sweep, the shorter sweep will not include some of the frequencies included in a longer sweep). Similarly, shot-point intervals may be adjusted for various types of sweeps, including linear sweeps, sweeps using digital codes, random sweeps, etc.

Figure 5A:
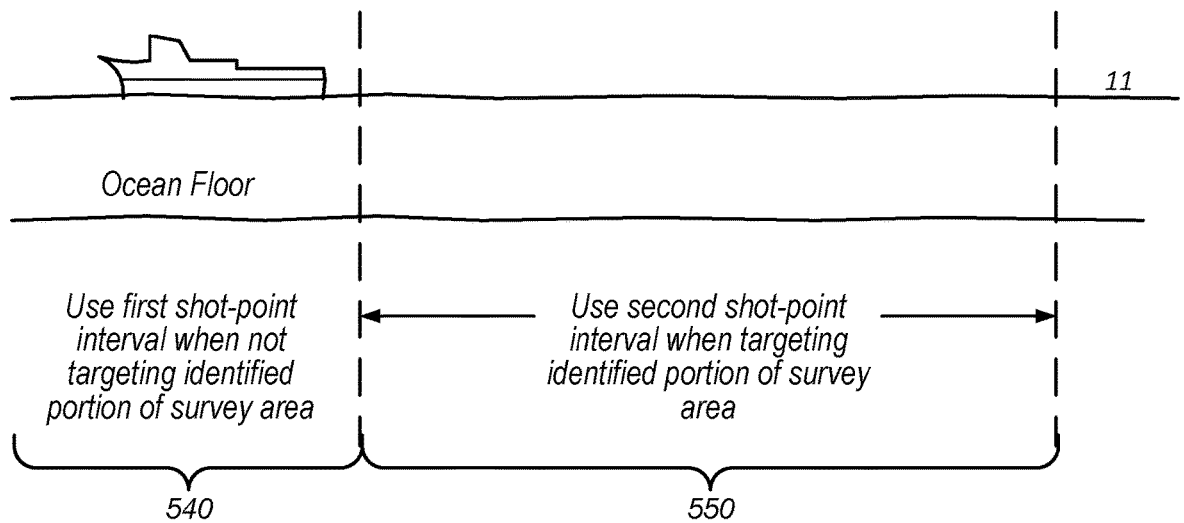
FIGS. 5A-5B are diagrams illustrating an example using different shot-point intervals for a source during a survey pass, according to some embodiments.
Figure 5B:
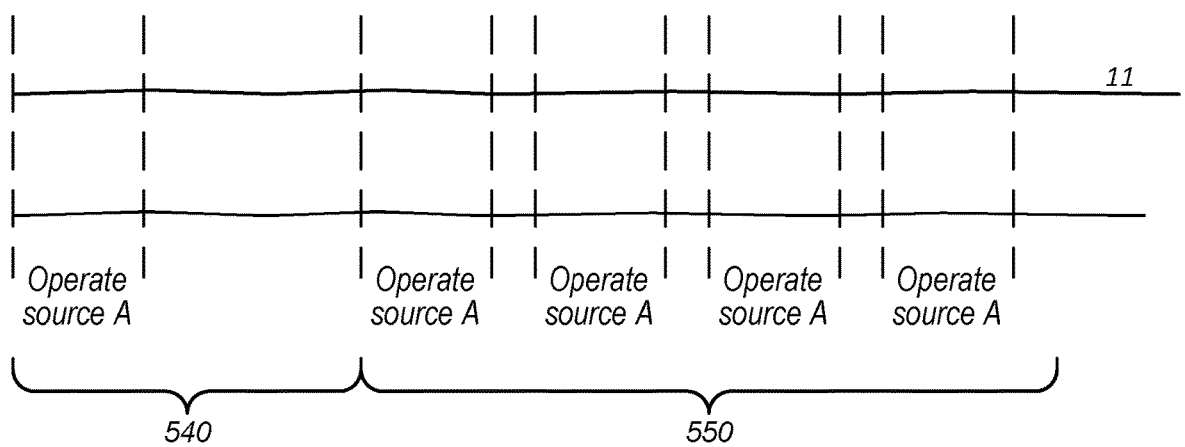

FIGS. 5A and 5B are side-view diagrams illustrating an example technique for adjusting shot-point interval of a given source when targeting an identified portion 210 of a survey area, according to some embodiments. In the illustrated example, source A is operated twice as often when targeting the identified portion 210 of the survey area (e.g., during portion 540 of the survey pass) as when not targeting the identified portion 210 (e.g., during portion 550 of the survey pass).

Note that various techniques discussed herein may be used in combination when targeting the identified portion 210, including using various adjusted output parameters for one or more survey sources. For example, digital codes of different lengths may be used, different numbers of sources may be used, different shot-point intervals may be used, different source amplitudes may be used, etc. In the example of FIGS. 5A and 5B, although not explicitly shown, the activations of source A may use gold codes of a different length when targeting the identified portion 210 of the survey area than when targeting other areas.

As discussed above, disclosed techniques adjust the output frequency spectra of a vibratory source. The spectra may be adjusted based on various goals. For example, for a known type of undersea structure that attenuates certain frequencies, the adjustment may boost those frequencies to flatten the frequency response from reflections under that structure. As a contrasting example, frequencies that will be severely attenuated may be reduced or removed from the output of the vibratory source, e.g., because those frequencies will be filtered to an extent that they are not providing useful information.

The system may also adjust the amplitude or frequency content of sweeps to reduce or avoid environmental impact. For example, if the identified portion 210 of the survey area 200 is an environmentally sensitive zone, the system may drive a source using different parameters that reduce environmental impact while targeting the environmentally sensitive zone. In some embodiments, the system adjusts the source output in real-time. For example, in response to detecting a marine mammal, the system may reduce the amplitude of the source output for all or a portion of its frequency spectrum. In some embodiments, the system is configured to identify a portion of a survey region (e.g., using latitude and longitude or other coordinates) or space (e.g., a sphere or other three-dimensional space) around a detected marine mammal and may update the location of the identified portion based on subsequent detections of the marine mammal. The system may then adjust source parameters when targeting this (potentially dynamically defined) area. In some embodiments, for shallow targets, the system is configured to shorten sweeps or reduce source amplitude (more generally, the system may adjust source parameters based on the depth of the sea floor).

Real-time detection of portion 210 may be performed using an online monitoring tool. In some embodiments, this tool stacks data for a small number of offset traces (e.g., a single trace) on the fly and applies a series of analysis windows at different depths to monitor amplitudes and frequency content. If one or more of the windows show a threshold change in amplitude or frequency over a certain number of traces, the system may adjust the source output (e.g., by changing the length of gold codes used to drive the source or changing other output parameters) in real time (e.g., during the same survey pass that detected the change in amplitude or frequency). In some embodiments, the online monitoring tool uses sensor data after autocorrelation.

A survey system, according to some embodiments, may also utilize a library of sweeps and select a sweep type from the library based on an encountered situation. For example, the library may include different types of sweeps for different known geological formations. Similarly, the library may include different types of sweeps for different known scenarios detected by a monitoring tool. As another example, the library may include sweeps for certain environmental situations. Based on detected survey conditions (e.g., identifying the portion 210 of the survey area) the system may select an appropriate sweep type. Thus, the system may use such a library to change the sweep type within a survey, within a survey pass, etc.

FIG. 6 is a diagram illustrating example digital codes with different lengths, according to some embodiments. In some embodiments, the system drives a source using digital code 610 when not targeting an identified portion 210 of the survey area and one of the remaining three codes (all of which are longer than code 610) when targeting other portions. Longer codes may be formed using various techniques. For example, if code 610 is a gold code with length N, code 620 may be another code with length 2N (or vice versa). As shown, longer codes may also be formed by repeating a digital code, e.g., performing a sweep using two copies of digital code 610 back to back. Further, a longer code may be generated by prepending or appending another code to code 610, e.g., as shown in the illustrated example by appending digital code 630. While the illustrated longer codes are approximately twice the length of code 610, various different ratios between codes of different lengths may be used in various embodiments.

Example Method

Figure 7:
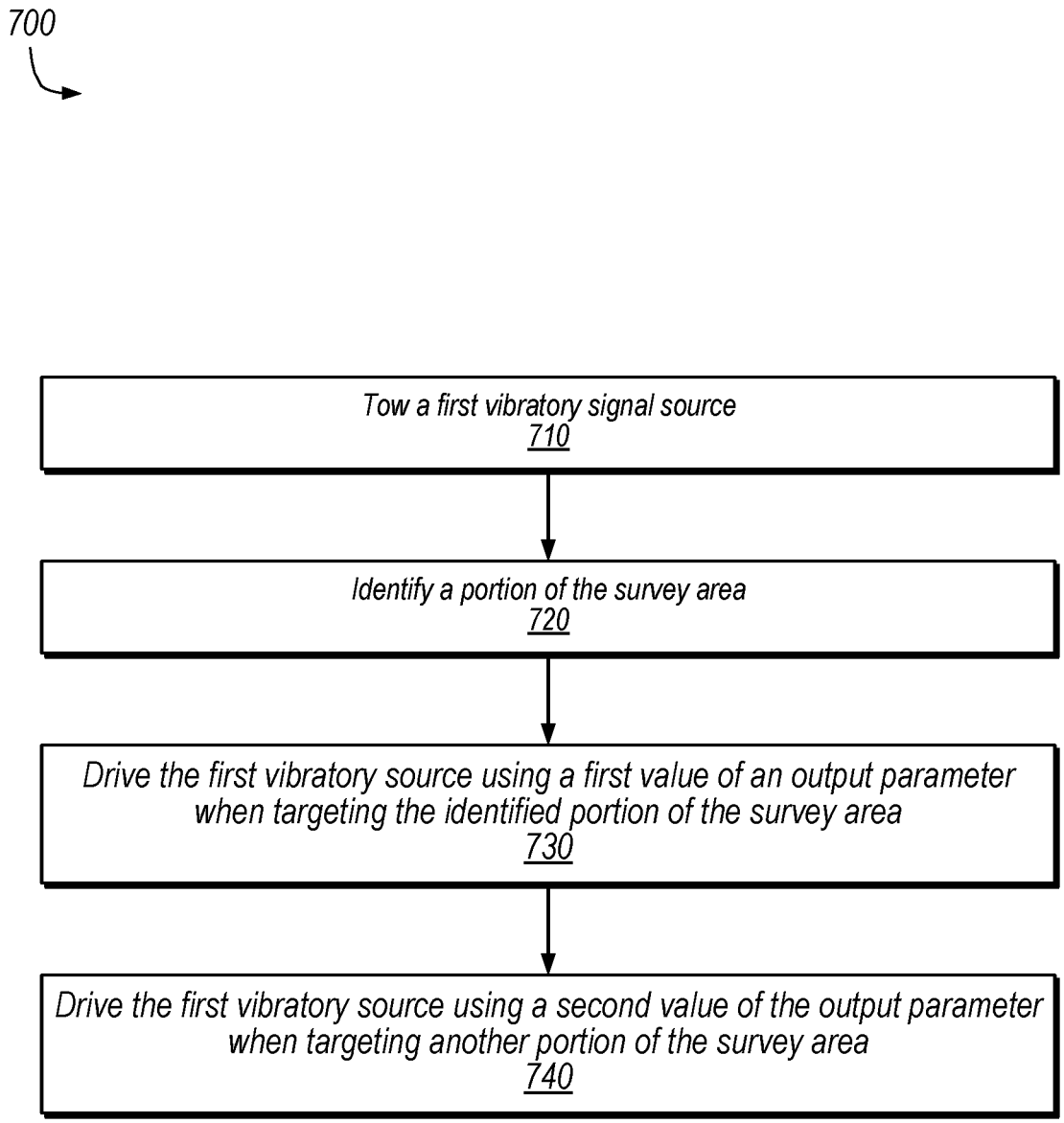
FIG. 7 is a diagram illustrating an example method, according to some embodiments.

FIG. 7 is a flow diagram illustrating an example method 700 for using targeted parameters for a vibratory signal source, according to some embodiments. In various embodiments, method 700 may be used by seismic survey system 100 of FIG. 1 to acquire improved seismic data in an area with challenging geological structures and may reduce environmental impact. For example, in some embodiments, control equipment 12 of survey vessel 10 is configured to perform, or to cause to be performed (e.g., by controlling the activation of one or more of signal sources 37), the operations described with reference to FIG. 7. Further, in some embodiments, control equipment 12 may include (or have access to) a non-transitory, computer-readable medium having instructions stored thereon that are executable by the control equipment 12 to cause the control equipment 12 to perform, or to cause to be performed, the operations described with reference to FIG. 7.

In FIG. 7, method 700 includes elements 710-740. While these elements are shown in a particular order for ease of understanding, other orders may be used. In various embodiments, some of the method elements may be performed concurrently, in a different order than shown, or may be omitted. Additional method elements may also be performed as desired.

At 710, in the illustrated embodiment, a survey system tows a first vibratory signal source. The system may also tow multiple streamers that each include multiple seismic sensors, or the system may operate in conjunction with one or more ocean bottom sensors, or the system may utilize both streamers and ocean bottom sensors.

At 720, in the illustrated embodiment, the system identifies a portion of interest in the survey area. For example, the system may access a survey plan that specifies the portion of the survey area. As another example, the system may identify the portion on-line during a survey based on signals emitted from the first vibratory signal source, reflected, and detected by one or more sensors (which may include streamer sensors, ocean bottom nodes, etc.). In some embodiments, the system may identify the portion in the same survey pass in which the system adjusts output parameters for the first source in method elements 740 and 750.

At 730, in the illustrated embodiment, the system drives the first vibratory source using first value of an output parameter when targeting the identified portion of the survey area. For example, the system may drive the first vibratory source using a first digital code having a first length.

At 740, in the illustrated embodiment, the system drives the first vibratory source using a second value of the output parameter when targeting another portion of the survey area. For example, the system may drive the first vibratory source using a digital code having a second length that is different than the first length. The first digital code may be a gold code that is longer than the second digital code. Non-limiting examples of codes of different lengths are discussed above with reference to FIG. 6. The system may drive the first vibratory source using the first and second digital codes in the same survey pass. Note that the different digital codes may cause outputs of the first vibratory source to have different frequency content. The first code may boost a frequency that is attenuated by a geological structure in or over the identified portion of the survey area. More generally, the system may drive at least a portion of a set of one or more signal sources using different values of a source output parameter when targeting the identified portion of the survey area than when targeting another portion of the survey area.

In some embodiments, the system also tows a second vibratory signal source (which may be a spare source) and drives the second vibratory signal source when the second vibratory signal source is targeting the identified portion of the survey area and refrains from driving the second vibratory signal source when targeting one or more other portions of the survey area. The second vibratory source may be driven in unison with the first vibratory source using the same digital codes (e.g., which may increase signal amplitude). The second vibratory source may be activated at different times than the first vibratory source, which may increase survey resolution, e.g., by providing reflections from different subsea locations.

In some embodiments, the system activates the first vibratory signal source using a first shot point interval when targeting the identified portion of the survey area and activates the first vibratory source using a second shot point interval when targeting another portion of the survey area.

In some embodiments, various disclosed techniques for identifying a portion of the survey area during a survey may be used to drive at least a portion of a set of one or more signal sources using different values of a source output parameter when targeting the identified portion of the survey area and when targeting another portion of the survey area. One example of a techniques for identifying the survey area includes stacking survey traces and detecting a change in amplitude that meets a threshold. The identification may occur during the same survey pass in which the output parameter is adjusted. The output parameter may specify one or more of: output amplitude of a signal source in the set of sources, combined output amplitude of multiple sources in the set of sources, sweep duration, length of digital code used to drive one or more sources, frequency content, amplitude of one or more output frequency bands detected to be attenuated by one or more subsea formations, a number of sources operated in the set of one or more sources, shot point interval, etc.

Example Computing Device

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various hardware elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 8:
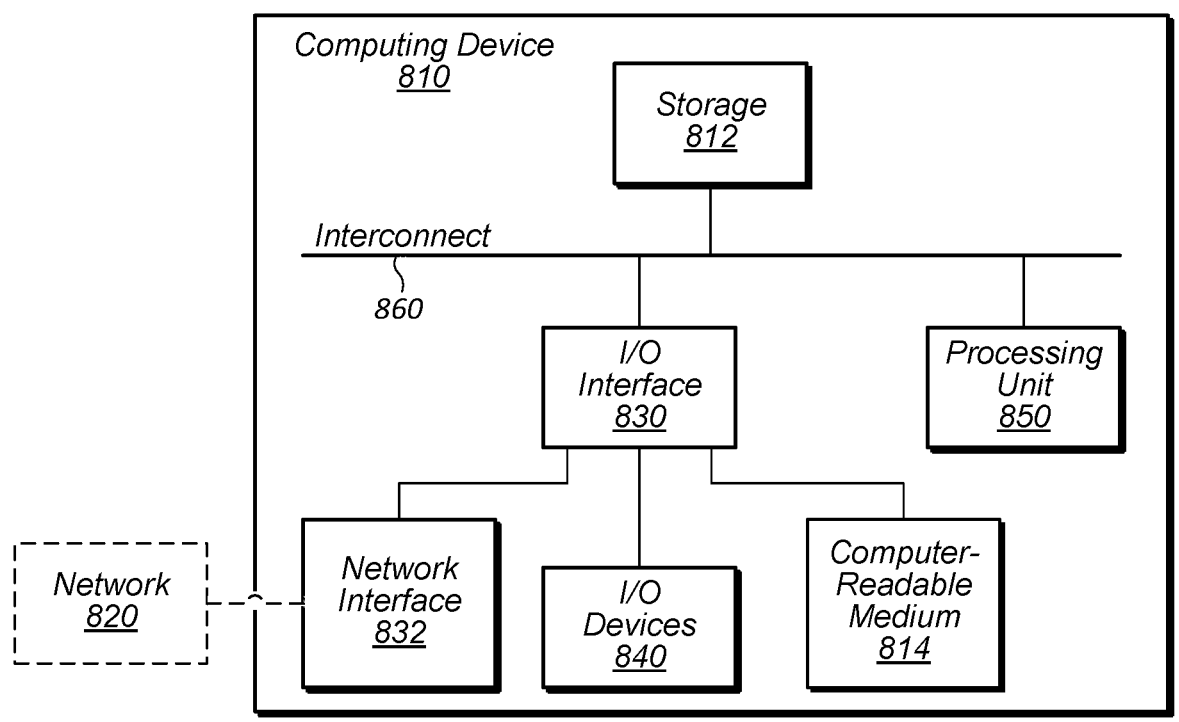
FIG. 8 is a diagram illustrating an example computer system, according to some embodiments.

Turning now to FIG. 8, a block diagram of a computing device 810 (which may also be referred to as a computing system) is depicted, according to some embodiments. Computing device 810 may be used to implement various portions of this disclosure. Computing device 810 is one example of a device that may be used as a mobile device, a server computing system, control equipment, a client computing system, or any other computing system implementing portions of this disclosure.

Computing device 810 may be any suitable type of device, including, but not limited to, a personal computer system, desktop computer, laptop or notebook computer, mobile phone, mainframe computer system, web server, workstation, or network computer. As shown, computing device 810 includes processing unit 850, storage subsystem 812, and input/output (I/O) interface 830 coupled via interconnect 860 (e.g., a system bus). I/O interface 830 may be coupled to one or more I/O devices 840. I/O interface 830 may also be coupled to network interface 832, which may be coupled to network 820 for communications with, for example, other computing devices. I/O interface 830 may also be coupled to computer-readable medium 814, which may store various survey data such as sensor measurements, survey control parameters, etc.

As described above, processing unit 850 includes one or more processors. In some embodiments, processing unit 850 includes one or more coprocessor units. In some embodiments, multiple instances of processing unit 850 may be coupled to interconnect 860. Processing unit 850 (or each processor within processing unit 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory in some embodiments. Storage subsystem 812 may store program instructions executable by computing device 810 using processing unit 850, including program instructions executable to cause computing device 810 to implement the various techniques disclosed herein. In at least some embodiments, storage subsystem 812 may represent an example of a non-transitory computer-readable medium that may store executable instructions.

In the illustrated embodiment, computing device 810 further includes non-transitory medium 814 as a possibly distinct element from storage subsystem 812. For example, non-transitory medium 814 may include persistent, tangible storage such as disk, nonvolatile memory, tape, optical media, holographic media, or other suitable types of storage. In some embodiments, non-transitory medium 814 may be employed to store and transfer geophysical data and may be physically separable from computing device 810 to facilitate transport. Accordingly, in some embodiments, non-transitory medium 814 may embody the geophysical data product discussed above. Although shown to be distinct from storage subsystem 812, in some embodiments, non-transitory medium 814 may be integrated within storage subsystem 812.

I/O interface 830 may represent one or more interfaces and may be any of various types of interfaces configured to couple to and communicate with other devices, according to various embodiments. In some embodiments, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 840.

It is to be understood the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A system, comprising:
   one or more processors; and
   one or more non-transitory computer readable media or memories having program instructions stored thereon that are executable by the one or more processors to:
   during a marine geophysical survey being performed in a body of water over a survey area:
   tow a survey system comprising a set of one or more vibratory signal sources;
   while the survey system is moving, detect when the survey system is targeting a portion of interest in the survey area, wherein the detecting step is based on one or more of:
     geodetic positions of the vibratory signal sources and of seismic sensors located in the survey area;
     characteristics of one or more survey traces generated by the seismic sensors responsive to seismic energy that is reflected from one or more reflectors disposed below a water bottom in the survey area; and
     depth of the water bottom in the targeted area;
   cause the set of one or more vibratory signal sources to exhibit a first output characteristic when the survey system is targeting the portion of interest; and
   cause the set of one or more vibratory signal sources to exhibit a second output characteristic, different than the first output characteristic, when the survey system is not targeting the portion of interest;
   wherein the causing steps comprise varying at least one output parameter configured to control the one or more vibratory signal sources.

2. The system of claim 1, wherein the output parameter specifies one or more of: output amplitude of a signal source in the set of sources, combined output amplitude of multiple sources in the set of sources, sweep duration, length of digital code used to drive one or more sources, or frequency content.

3. The system of claim 1, wherein the output parameter specifies amplitude of one or more output frequency bands determined to be attenuated by one or more subsea formations.

4. The system of claim 1, wherein the output parameter specifies a number of sources operated in the set of one or more sources.

5. The system of claim 1, wherein the output parameter specifies a shot point interval.

6. The system of claim 1, wherein the system is configured to perform the detecting step and both of the causing steps during a same survey pass.

7. The system of claim 1, wherein the detecting step is further based on determined amplitudes from multiple monitoring windows at different depths.

8. The system of claim 1, wherein the detecting step is further based on signals received from one or more streamer sensors or one or more ocean bottom nodes.

9. The system of claim 1, wherein the detecting step is further based on a midpoint between a source in the set of vibratory sources and a seismic receiver.

10. The system of claim 1, wherein the system is configured to drive a first portion of the set of signal sources using a first value of the output parameter and to drive a second portion of the set of signal sources using a second value of the output parameter in response to detecting that only a portion of the set of signal sources is targeting the portion of interest.

11. The system of claim 1, wherein:
    the system comprises a library of possible values for the output parameter;
    the causing steps comprise selecting a value of the output parameter from the library of values; and
    the selecting is based on one or more characteristics of the portion of interest.

12. The system of claim 1, wherein the detecting step is further based on stacking survey traces and determining whether a change in amplitude meets a threshold.

13. A system, comprising:
    one or more processors; and
    one or more memories having program instructions stored thereon that are executable by the one or more processors to:
    during tow, through a body of water, of a set of one or more vibratory signal sources for a marine geophysical survey over a survey area:
    identify a portion of the survey area based on signals emitted from at least a portion of the one or more vibratory signal sources, reflected from the portion of the survey area, and measured by one or more seismic sensors, wherein the identifying is performed based on stacking survey traces and detecting a change in amplitude that meets a threshold;
    drive at least a portion of the set of signal sources using a first value of an output parameter when targeting the identified portion of the survey area; and
    drive at least a portion of the set of vibratory signal sources using a second value of the output parameter when targeting another portion of the survey area;
    wherein the detecting the change in amplitude is performed based on determined amplitudes from multiple monitoring windows at different depths.

* * * * *